June 27, 1967     F. T. SPENCER     3,328,505
METHOD OF MAKING SOFT AND DRAPEABLE FOAMED PLASTIC SHEETING
Original Filed Aug. 7, 1962
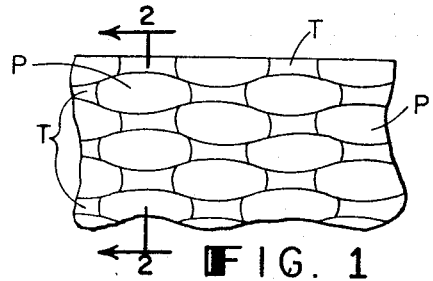
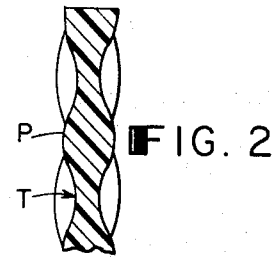
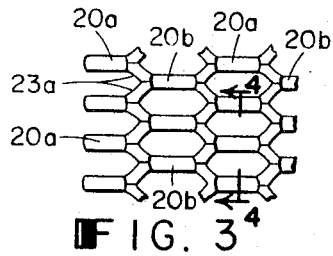
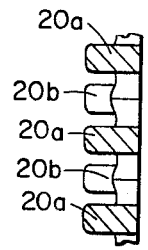
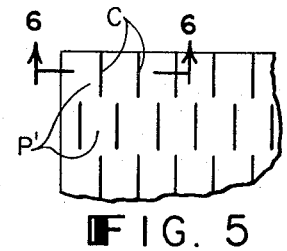
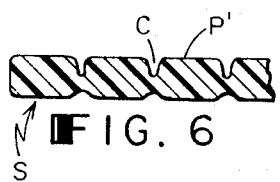
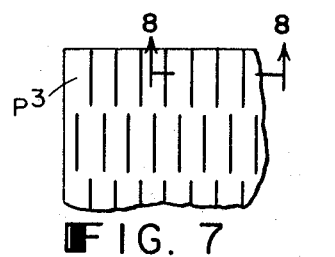
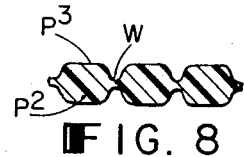
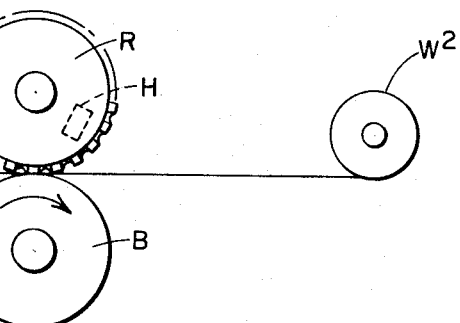
INVENTOR.
Francis T. Spencer
by Roberts Cushman o Grove
Att'ys

United States Patent Office 3,328,505
Patented June 27, 1967

3,328,505
METHOD OF MAKING SOFT AND DRAPEABLE FOAMED PLASTIC SHEETING
Francis T. Spencer, Biddeford, Maine, assignor to West Point-Pepperell, Inc., Boston, Mass., a corporation of Georgia
Original application Aug. 7, 1962, Ser. No. 215,435. Divided and this application Mar. 23, 1966, Ser. No. 536,827
4 Claims. (Cl. 264—321)

This invention pertains to foamed plastic sheeting and more especially to foamed sheeting which is characterized by its notable limpness or drapeability. Such sheeting is useful, for example, because of its heat-insulating qualities in the manufacture of wearing apparel, and which, by reason of its softness, freedom from lint and its chemical neutrality is useful for many other purposes, for instance, as a wrapping for delicate articles, or as a polishing or wiping cloth for the cleaning of lenses or other glass articles or finely finished metal parts. The present application is a division of application for United States Letters Patent, Ser. No. 215,435, filed Aug. 7, 1962, by Francis T. Spencer, since abandoned.

The invention has for its object the provision of a novel way of preparing foamed synthetic plastic sheeting which is elastically stretchable, soft, very limp and drapeable and which is readily made by a simple and inexpensive treatment of commercial foamed sheeting, for specific example, foamed polyurethane.

Other and further objects and advantages of the invention will be pointed out in the following more detailed description and by reference to the accompanying drawings wherein:

FIG. 1 is a diagrammatic plan view, to large scale, showing a piece of foamed plastic sheeting made according to the invention;

FIG. 2 is a section, to larger scale than FIG. 1, on the line 2—2 of FIG. 1;

FIG. 3 is a fragmentary, diagrammatic developed view showing the pattern of the peripheral surface of an embossing implement, for example, a roll, such as may be employed in making the fabric of FIG. 1;

FIG. 4 is a larger scale section lengthwise of an embossing roll, substantially on the line 4—4 of FIG. 3;

FIG. 5 is a fragmentary diagrammatic plan view to enlarged scale, illustrating sheeting made by a modified procedure, also according to the invention;

FIG. 6 is a section on the line 6—6 of FIG. 5, but to larger scale;

FIG. 7 is a fragmentary plan view showing sheeting of the type illustrated in FIG. 5, but such as results from a further modified procedure, as here specifically claimed;

FIG. 8 is a section on the line 8—8 of FIG. 7, but to larger scale; and

FIG. 9 is a diagrammatic vertical section illustrating apparatus useful in the manufacture of sheeting of the type shown in FIGS. 7 and 8.

As above noted the principal object of the present invention is to provide a method of forming foamed synthetic plastic sheeting which is very soft, limp and drapeable, as compared with ordinary commercially available foamed plastic sheeting of commensurate thickness, in particular commercial polyurethane foam, and so treating the commercial sheet foam as greatly to increase its normal drapeability and to make it limp so that its initial stiffness and resistance to bending is greatly reduced.

In accordance with one embodiment of the invention and in the attainment of the above object, polyurethane sheeting of commercial type and, for instance, of the order of $\frac{1}{10}$ of an inch in thickness is subjected to the action of an implement which so modifies the sheeting that in its modified form it consists of a multitude of relatively movable, but integrally joined masses, each of substantially the thickness of the original sheeting but united solely by webs of the original material which are much less in thickness than the original material. Such relatively movable, integrally united masses may be formed by suitably indenting the uniformly thick commercial sheeting by means of an embossing or equivalent indenting device, for instance an embossing roll.

In FIGS. 1 and 2 there is illustrated an embodiment of the present invention wherein the relatively movable but integrally joined masses of the foamed plastic are indicated as elongate puffs P arranged in spaced parallel rows wherein the puffs of one row are staggered with relation to the puffs of the next adjacent row, the contiguous ends of the puffs, as shown in FIG. 1, overlapping. These puffs are defined by indentations T which, as shown in FIG. 1, are isolated from each other. In one desirable embodiment of the invention, the puffs P are of a maximum length of the order of $\frac{3}{16}$ of an inch and of a maximum width of $\frac{1}{16}$ of an inch and taper toward each end. Assuming that the sheeting in its initial state is $\frac{1}{10}$ of an inch in thickness, the maximum depth of the indentations is desirably of the order of 0.075 inch. Indentations of that depth as compared with the thickness of the original sheeting extend through the major portion, only, of the thickness of the sheeting, leaving thin webs of the original, substantially unmodified, foam material integrally uniting the puffs. Indentations of proportionate depth would be formed, in accordance with the present invention, in commercial sheeting of a different initial thickness.

Commercial polyurethane foams, such as are at present available, if impressed by a heated embossing tool, may be embossed so as to provide permanent indentations therein without damaging the material. In accordance with the present invention, the original sheeting is provided with a surface contour such as that illustrated in FIGS. 1 and 2, by the use of an embossing device of a pattern such as illustrated, for example, in FIGS. 3 and 4. This device may be, for example, a flat platen which is reciprocated up and down as the foam material is moved intermittently beneath it so as, at each downward stroke, to impress an area of the sheeting with a pattern according to the face of the embossing platen. However, since by the use of a tool heated to a suitable temperature, it is possible to produce a permanent embossed pattern in the foam ply in a period of a fraction of a minute, it is preferred to employ, as the embossing element, a constantly rotating roll or cylinder whose surface is contoured to provide the desired pattern in the foam. For example, temperatures between 320° F. and 500° F., with corresponding periods of from $\frac{1}{50}$ to $\frac{1}{180}$ of a minute have given satisfactory results. It will, of course, be understood that if foams of different character be employed, the embossing temperature or time will be appropriately varied.

In FIG. 3 the peripheral surface of such a roll is illustrated in developed, diagrammatic form, said surface being shown as provided with circumferentially extending rows of circumferentially elongate projections 20a, 20b, with the projections 20a in one row staggered with relation to the projections 20b in the next adjacent row. These projections are connected at their ends by ribs 23 of lesser height than the projections 20a and 20b. Because of the spongy, resilient character of the foam ply, the embossing action may produce a surface pattern which is substantially alike, but in reverse, on opposite sides of the sponge layer. Desirably, the ribs and projections of the embossing tool are smoothly rounded so that, instead of cutting the polyurethane foam, they form indentations of substantial width as they are pressed into it, acting with a compressing action to compact the foam at all points of contact with the tool, with the result that the material is subjected to approximately the same degree of heat at all points while being compressed, and is thereby induced to take a permanent set in the shape determined by the shape of the projections. Merely by way of specific example and dimensions which have been found useful in the preparation of material having the desired characteristics, the maximum height of the projections 20a, 20b, measured from the surface of the roll proper, may be of the order of 0.075 inch; while the maximum length of each of the projections 20a, 20b may be of the order of 0.125 inch; and the distance between lines parallel to the axis of the roll, drawn through the contiguous ends of the projections 20a, 20b, may be of the order of 0.0625 inch. Again, the maximum transverse width of a projection 20a or 20b may be of the order of 0.0417 inch, while the maximum spacing between the proximate faces of projections in adjacent rows (and thus, the maximum width of the indentation made thereby) may be of the order of 0.0219 inch.

As above noted, these dimensions are merely by way of example of one embossing pattern which has been found useful in producing sheeting of the desired type, but it is obvious that an embossing pattern of dimensions differing from those above may be employed, if desired, in the practice of the invention.

Accordingly, it is to be understood that while sheeting having a pattern like that of FIG. 1 possesses the desired characteristics, the invention is not limited to that particular pattern. For example, by the use of an embossing roll having an appropriate surface pattern, foam such as illustrated in FIGS. 5 and 6 may be made, this sheeting being of a slightly different and simpler pattern, wherein the elongate puffs $P^1$ are approximately rectangular in plan view, adjacent puffs being defined by intervening rectilinear indentations C. The reverse side of this sheeting is approximately as indicated at S (FIG. 6), being relatively smooth as compared with the surface wherein the indentations C are formed. The material thus illustrated in FIGS. 5 and 6 has substantially the same characteristics as that illustrated in FIGS. 1 and 2, being very soft, limp and drapeable.

However, it has been found that if, when embossing the foam sheeting whether of one type or the other (but for particular illustrative purposes, considering the sheeting of FIGS. 5 and 6), the sheet material be placed under longitudinal tension as it approaches the embossing roll, the limpness of the sheeting is thereby even further enhanced; it becomes even softer to the touch than that illustrated in FIGS. 5 and 6; and is abnormally stretchable.

As the result of such treatment, using the same embossing roll, for example, as that employed in making the sheeting of FIGS. 5 and 6, the puffs $P^3$, as shown in FIG. 7, are relatively longer and narrower than those shown in FIG. 5, while at the same time the opposite faces of the fabric exhibit puffs $P^2$ and $P^3$ respectively (FIG. 8) of almost the same depth, these puffs at opposite faces being now integrally joined only by very thin intermediate webs W of the foam material. For example, an elongation of the commercial sheeting, of approximately 50%, as it approaches the embossing roll, results in a substantial narrowing of the puffs as compared with those of FIG. 5, with concomitant elongation of the puffs as compared with the material made by the same embossing roll but without tension. If the fabric be elongated to a somewhat greater extent in approaching the embossing rolls, the fabric is thereby permanently thinned down as compared with the original sheeting and the puffs become less pronounced, while, at the same time, the fabric becomes even softer to the touch while retaining its limpness and drapeability. However, the tensioning force applied should not be sufficient to stretch the foam beyond its elastic limit.

It may further be noted that fabric made in accordance with the various embodiments of the invention, as hereinabove described, is so elastic in its nature that when crushed to form a dense mass and released it shows little, if any, tendency to retain permanent creases.

In FIG. 9 there is diagramatically illustrated apparatus such as may be employed in making sheeting like that of FIGS. 7 and 8. In this view the character R represents the heated embossing roll; B a smooth surface bed roll by which the material is supported; $W^1$ represents a roll of the untreated foamed plastic sheeting such as the commercial sheeting supplied by a foam manufacturer; while the rolls $R^2$ and $R^3$ designate a pair of gripping rolls between which the sheeting passes on its way to the embossing roll. These gripping rolls, or at least one of them, is driven at a predetermined lesser peripheral speed, in a definite selected ratio, relatively to that of the embossing roll R, so that the rolls $R^2$ and $R^3$ tend to retard the advance of the material by the embossing roll and thus maintain the material between the rolls $R^2$ and $R^3$ and the embossing roll under longitudinal tension. After passing between the rolls R and B, the embossed material may be wound to form the roll $W^2$. Desirably, provision would be made for varying the speed ratio of the roll R and the rolls $R^2$, $R^3$ whereby to vary the degree of stretch imparted to the sheeting, according to the particular factors involved, such, for example, as the thickness of the sheeting, the composition of the sheeting employed, or the degree of thickness reduction which is desired. The bed roll B may be heated if desired.

It will be understood that in any case the embossing tool, whether a roll or equivalent implement, will be heated to a proper temperature such that the embossed pattern will be permanent, the roll R in FIG. 9 being diagrammatically shown as provided with an internal heating element H for this purpose.

While certain desirable embodiments of the invention have herein been disclosed by way of example, it is to be understood that the invention is broadly inclusive of any and all modifications either of apparatus or materials employed which may be considered to be equivalent to those factors which are herein specifically disclosed and claimed.

I claim:

1. That method of preparing, from fully cured, commercial polyurethane sheet foam, a soft, elastically stretchable, homogeneous, single ply, porous sheet which is pervious to air and water and which is of cellular structure throughout and having therein isolated depressions in each of its faces, the depressions being of approximately the same shape and size and being disposed in rows, wherein those in one row are staggered relatively to those in adjacent rows, and wherein each depression in one face is directly opposite to and registers with a depression in the other face, said method comprising as steps: providing a sheet of commercial, fully cured polyurethane foam of selected thickness, supporting said sheet upon a smooth surfaced rigid bed member, applying tensioning stress to the sheet such as to elongate it, and, while maintaining said tensioning stress, so pressing suitably shaped heated indenting elements downwardly into the tensioned sheet that, as the result of such pressure, there is formed in each face of the sheet an all-over surface pattern of isolated indentations of such depth and so arranged as to break the continuity of each surface of the sheet and to define relatively movable masses of foam material integrally joined by thin webs of the foam material, and maintaining said heated elements at a temperature such as to impart a permanent shape to said masses and webs but without melting or damaging any of the polyurethane sheet material.

2. That method of preparing a soft, drapeable and elastically stretchable, homogeneous, single-ply sheet material which is so limp as, for example, to be appropriate for use as a heat-insulating ply in wearing apparel, said method comprising as steps: providing a sheet of completely cured, resiliently spongy, homogeneous, commercial plastic foam having physical characteristics approximating those of commercial polyurethane foam and of a uniform thickness, supporting said sheet upon a smooth, rigid bed member, applying tensioning stress to the sheet such as to elongate it, and while maintaining such stress, applying pressure to the exposed surface of the tensioned material by means of a heated roll from whose foam-contacting peripheral surface project a multitude of uniformly distributed indenting elements kept at a temperature such as to impart a permanent contour to the sheet material but less than that which would melt or damage the material, each such element being elongate in the direction of the tensioning force and being of approximately uniform transverse thickness and of a length approximating one-half the thickness of the sheet, and which is so smoothly rounded at its free edges as to avoid cutting the foam as it is pressed into it, said elements being so arranged that, as the result of such pressure, the foam sheet exhibits an overall permanent surface configuration comprising isolated indentations extending inwardly from each face, respectively, of the sheet, the indentations in each respective face being disposed in rows with those in one row staggered relatively to those in adjacent rows and being of a depth approximating one-half the thickness of the original foam sheet, the indentations thus formed defining parallel rows of foam masses, each such foam mass being a portion of the original sheet and each being of a maximum depth but slightly less than the thickness of the original foam sheet, said masses being integrally joined by thin webs of the foam, the completed sheet of foam being more elastic, softer and limper than the original sheet before treatment.

3. The method according to claim 2, further characterized in employing commercial polyurethane sheeting of approximately $\frac{1}{10}$ of an inch in thickness, and, as an embossing implement, a roll having indentation-forming projections on its peripheral surface whose maximum height, measured from the surface of the roll, is approximately 0.075 inch.

4. The method according to claim 2, further characterized in that the tensioning force which is applied to the sheet material while embossing it is such as to elongate it approximately 50%.

References Cited
UNITED STATES PATENTS

| | | | |
|---|---|---|---|
| 2,878,153 | 3/1959 | Hacklander | 264—321 XR |
| 3,009,848 | 11/1961 | Simon | 264—157 XR |
| 3,137,746 | 6/1964 | Seymour et al. | 264—73 |

ALEXANDER H. BRODMERKEL, *Primary Examiner.*

P. E. ANDERSON, *Assistant Examiner.*